(12) United States Patent
Ishikawa

(10) Patent No.: US 12,425,737 B2
(45) Date of Patent: Sep. 23, 2025

(54) IMAGE CAPTURING APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Daisuke Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 18/323,037

(22) Filed: May 24, 2023

(65) Prior Publication Data

US 2023/0388637 A1    Nov. 30, 2023

(30) Foreign Application Priority Data

May 31, 2022    (JP) .................. 2022-089133

(51) Int. Cl.
*H04N 23/69* (2023.01)
*H04N 23/667* (2023.01)
*H04N 23/695* (2023.01)

(52) U.S. Cl.
CPC ........... *H04N 23/69* (2023.01); *H04N 23/667* (2023.01); *H04N 23/695* (2023.01)

(58) Field of Classification Search
CPC .... H04N 23/69; H04N 23/667; H04N 23/695; H04N 23/661
See application file for complete search history.

(56) References Cited

U.S. PATENT DOCUMENTS

| | | | |
|---|---|---|---|
| 2011/0128377 A1* | 6/2011 | Katz .................. | H04N 5/272 348/143 |
| 2018/0136869 A1* | 5/2018 | Mola .................. | G06F 11/30 |
| 2019/0158754 A1* | 5/2019 | Minato ............... | G05D 1/0094 |

FOREIGN PATENT DOCUMENTS

| JP | 2009017480 A | 1/2009 |
|---|---|---|
| JP | 2011035638 A | 2/2011 |

* cited by examiner

*Primary Examiner* — Christopher K Peterson
(74) *Attorney, Agent, or Firm* — Canon U.S.A., Inc. IP Division

(57) ABSTRACT

An image capturing apparatus that communicates with an information processing apparatus that performs processing of combining an image of a real space and an image of a virtual space, the image capturing apparatus includes an imaging unit configured to capture an image of a subject formed by an imaging optical system, a determination unit configured to determine at least one mode among a plurality of modes related to a viewing angle of the image capturing apparatus, a generation unit configured to generate camera data including a first parameter indicating the mode determined by the determination unit and a second parameter corresponding to a lens position of the imaging optical system, and a transmission unit configured to transmit camera setting information including the camera data to the information processing apparatus, wherein the first parameter and the second parameter are used to identify the viewing angle of the image capturing apparatus.

9 Claims, 13 Drawing Sheets

FIG.3

| ENLARGEMENT MODE | ID NUMBER N |
|---|---|
| OPTICAL ZOOM + DIGITAL ZOOM | 00 |
| DIGITAL TELE-CONVERTER (×2) | 01 |
| DIGITAL TELE-CONVERTER (×3) | 02 |
| OPTICAL INTERLOCKING DIGITAL ZOOM | 03 |
| ... | ... |

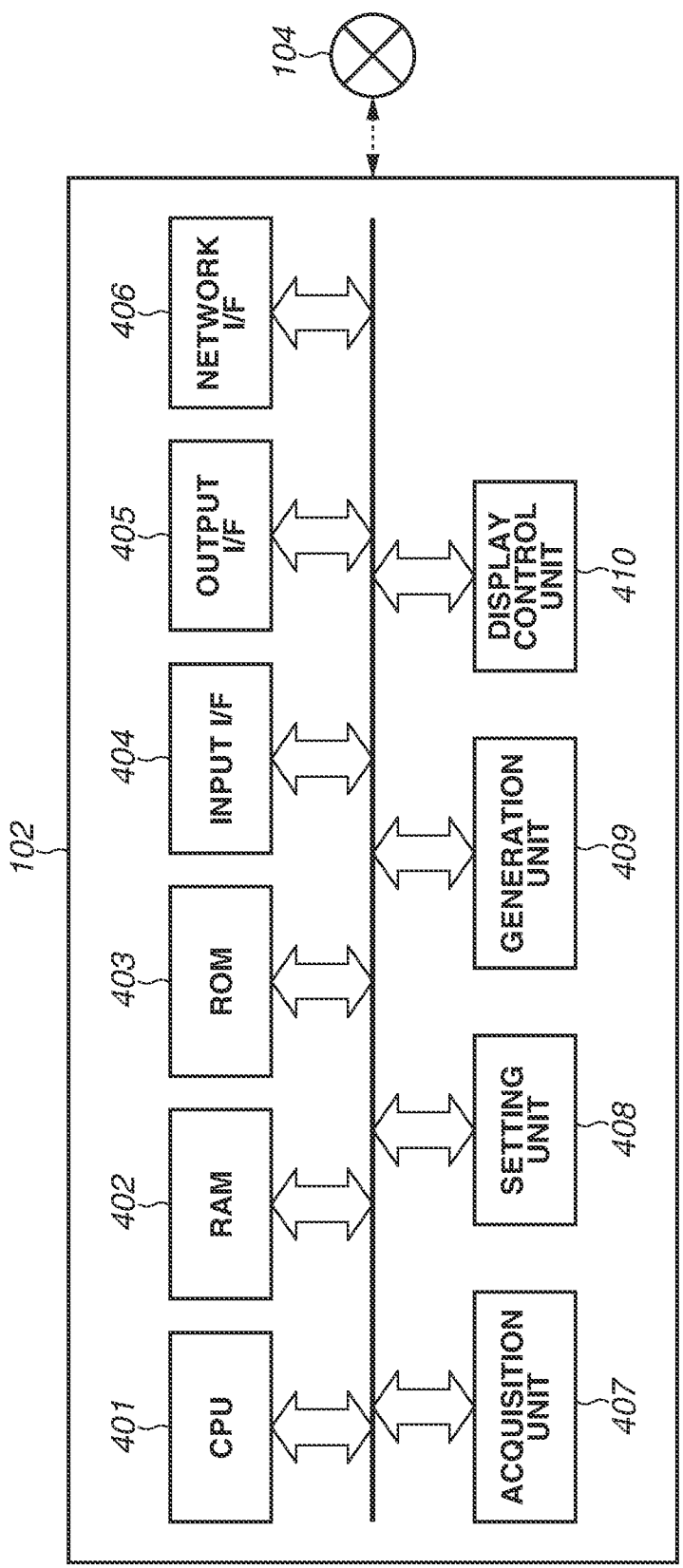

DISTORTION ABERRATION

CORRECTED IMAGE

FIG.11

| | CAMERA DATA D | ELECTRONIC MAGNIFICATION M | |
|---|---|---|---|
| WIDE-ANGLE END | 000000 | 1 | |
| | 0002FC | 1 | |
| | 00054C | 1 | |
| | ... | ... | HIGH-ORDER 4 BITS: 00 → ID NUMBER 00 |
| OPTICAL TELEPHOTO END | 004000 | 1 | |
| | ... | ... | |
| DIGITAL ZOOM END | 006000 | 20 | |
| | 010000 | 2 | |
| | 0102FC | 2 | |
| | 01054C | 2 | HIGH-ORDER 4 BITS: 01 → ID NUMBER 01 |
| | ... | ... | |
| OPTICAL TELEPHOTO END | 014000 | 2 | |
| | ... | ... | |
| WIDE-ANGLE END | 030000 | 1 | |
| | 0302FC | 1 | |
| | 03054C | 1.2 | |
| | ... | ... | HIGH-ORDER 4 BITS: 03 → ID NUMBER 03 |
| OPTICAL TELEPHOTO END | 034000 | 2 | |
| | ... | ... | |
| DIGITAL ZOOM END | 036000 | 20 | |

FIG.13

| | CAMERA DATA D | VIEWING ANGLE V | |
|---|---|---|---|
| WIDE-ANGLE END | 000000 | ○○ | |
| | 0002FC | △△ | |
| | 00054C | ... | HIGH-ORDER 4 BITS: 00 → ID NUMBER 00 |
| | ... | ... | |
| OPTICAL TELEPHOTO END | 004000 | ▽▽ | |
| | ... | ... | |
| DIGITAL ZOOM END | 006000 | □□ | |
| | 010000 | ●● | |
| | 0102FC | ▲▲ | |
| | 01054C | ... | HIGH-ORDER 4 BITS: 01 → ID NUMBER 01 |
| | ... | ... | |
| OPTICAL TELEPHOTO END | 014000 | ▼▼ | |
| | ... | ... | |

IMAGE CAPTURING APPARATUS, INFORMATION PROCESSING APPARATUS, CONTROL METHOD, AND STORAGE MEDIUM

BACKGROUND OF THE DISCLOSURE

Field of the Disclosure

The present disclosure relates to an image capturing apparatus, an information processing apparatus, a control method, and a storage medium.

Description of the Related Art

In recent years, a technology for enabling various video-image expressions by combining an image captured by a camera in a real space and a computer graphics (CG) image has been known. The CG image is generated by projection of a state of an object present in a three-dimensional virtual space generated by use of a computer onto a plane and rendering of the projected state. To define the plane for the projection, a virtual camera is set in the virtual space.

Japanese Patent Application Laid-Open No. 2011-35638 discusses a technique for transmitting operation information of a camera in a real space to a computer, and generating a CG image by interlocking the operation of the camera in the real space and a camera in a virtual space. In order to generate a combined image having no discomfort, it is desirable that a viewing angle in the virtual space and a viewing angle in the real space match each other.

Japanese Patent Application Laid-Open No. 2009-17480 discusses a technique for transmitting lens data (such as a focal length and a zoom value) of a camera in a real space and reducing a difference between a viewing angle in the real space and a viewing angle in a virtual space based on the lens data.

SUMMARY OF THE DISCLOSURE

According to an aspect of the present disclosure, an image capturing apparatus that communicates with an information processing apparatus that performs processing of combining an image of a real space and an image of a virtual space, the image capturing apparatus includes an imaging unit configured to capture an image of a subject formed by an imaging optical system, at least one processor, and a memory in communication with the at least one processor, the memory storing instructions that, when executed by the processor, cause the processor to function as a determination unit configured to determine at least one mode among a plurality of modes related to a viewing angle of the image capturing apparatus, a generation unit configured to generate camera data including a first parameter indicating the mode determined by the determination unit and a second parameter corresponding to a lens position of the imaging optical system, and a transmission unit configured to transmit camera setting information including the camera data to the information processing apparatus, wherein the first parameter and the second parameter are used to identify the viewing angle of the image capturing apparatus.

Further features of the present disclosure will become apparent from the following description of exemplary embodiments with reference to the attached drawings.

BRIEF DESCRIPTION OF THE DRAWINGS

FIG. 3 is a diagram illustrating the relationship between enlargement mode and identification (ID) number.

FIG. 4 illustrates a configuration of an information processing apparatus according to the present exemplary embodiment.

FIG. 11 illustrates a table representing the relationship between camera data and electronic magnification according to the present exemplary embodiment.

FIG. 13 illustrates a table representing the relationship between camera data and viewing angle according to the present exemplary embodiment.

DESCRIPTION OF THE EMBODIMENTS

Exemplary embodiments of the present disclosure will be described in detail below with reference to the attached drawings. The following exemplary embodiments are merely examples for implementing the present disclosure and can be appropriately modified or changed depending on configurations and various conditions of apparatuses to which the present disclosure is applied, and thus the present disclosure is in no way limited to the following exemplary embodiments. In addition, parts of the following exemplary embodiments may be appropriately combined and configured.

(System Configuration)

Figure 1:
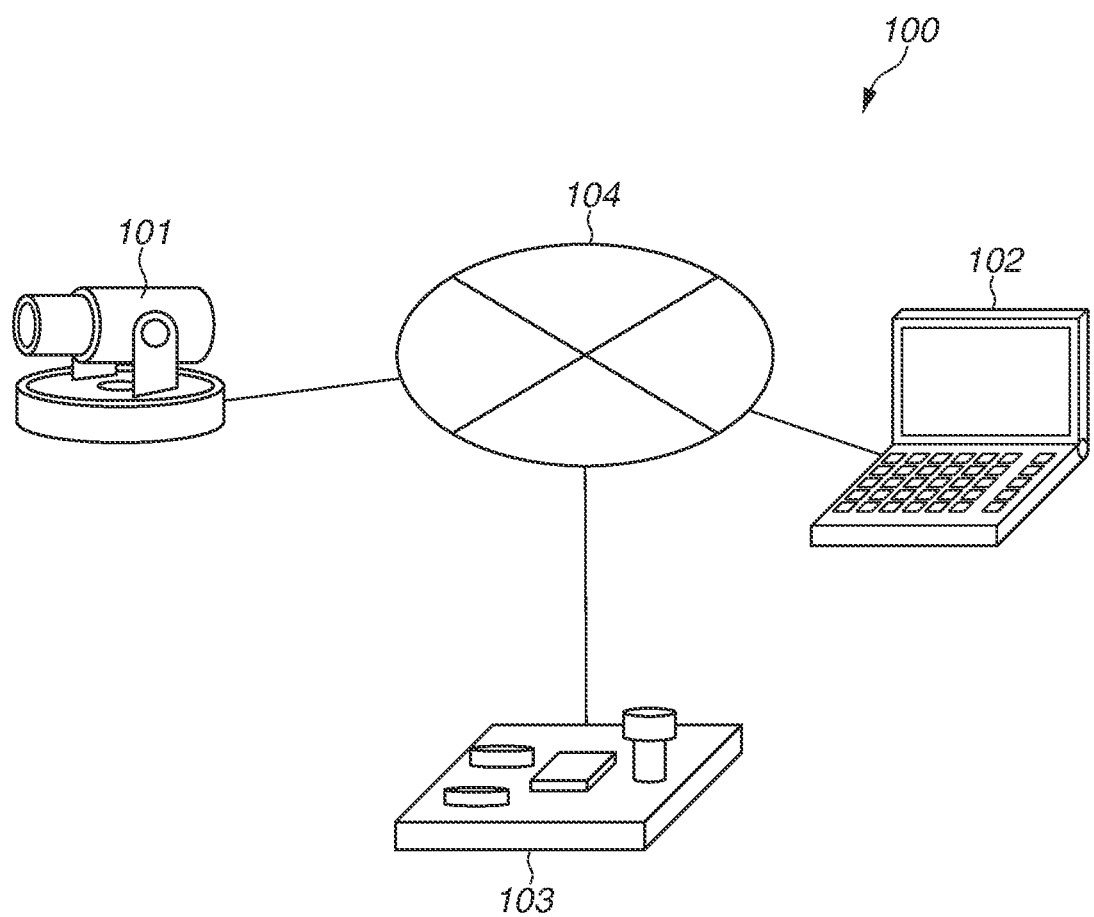
FIG. 1 illustrates a configuration of an image capturing system according to an exemplary embodiment.

FIG. 1 is a diagram illustrating an example of a configuration of an image capturing system 100 according to a first exemplary embodiment. The image capturing system 100 includes an image capturing apparatus 101, an information processing apparatus 102, a control apparatus 103, and a network 104.

The image capturing apparatus 101 captures a subject image in a real space and generates an image. The image capturing apparatus 101 transmits the generated image to the information processing apparatus 102 via the network 104 in response to a request from the control apparatus 103.

The image capturing apparatus 101 may actively transmit image data and the like to the information processing apparatus 102 or the control apparatus 103 even if there is no request from the control apparatus 103. The image capturing apparatus 101 operates by receiving operation information from the control apparatus 103 via the network 104. The image capturing apparatus 101 can change a viewing angle by driving in a pan direction or a tilt direction, or by changing a magnification for optical zoom. Thus, the operation information from the control apparatus 103 includes information for controlling driving in the pan direction or the tilt direction and information (e.g., a focal length, a zoom position, a focus position, and a lens position) for setting the magnification for the optical zoom. The operation information is determined by various methods such as an input by a user and a function of automatically tracking a subject. The image capturing apparatus 101 transmits information about the image capturing apparatus 101, including the current position and orientation, the zoom position and the focus position, and a rotation angle in the pan direction or the tilt direction of the image capturing apparatus 101, to the information processing apparatus 102 as camera setting information. It is desirable that the configuration of the camera setting information be a configuration necessary for the information processing apparatus 102 to perform combining processing to be described below, and the configuration of the camera setting information can be changed as appropriate.

The information processing apparatus 102 sets a viewpoint in a virtual space based on the camera setting information received via the network 104. Subsequently, the information processing apparatus 102 generates an image viewed from the viewpoint set in the virtual space as an image (a CG image) of the virtual space based on the viewpoint set in the virtual space. In other words, the information processing apparatus 102 generates the image of the virtual space by projecting the virtual space to a plane defined by a virtual camera set in the virtual space and rendering the virtual space. The viewing angle of the virtual camera can be set based on a viewing angle identified by a method to be described below, a panning angle and a tilting angle included in the camera setting information, and the like. Further, the information processing apparatus 102 can express a video image in which a subject in the real space is captured as if the subject is present in the virtual space, by combining the generated image of the virtual space and the image data received from the image capturing apparatus 101 via the network 104. Examples of the information processing apparatus 102 include a personal computer (PC), a tablet terminal, and a smartphone. It is also possible to operate an object in the virtual space based on the received camera setting information. For example, a viewpoint in the virtual space may be treated and operated as an object of the camera based on the camera setting information.

The control apparatus 103 is an apparatus for operating the image capturing apparatus 101. For example, the control apparatus 103 may be a PC, a tablet terminal, a smartphone, or an apparatus such as a general-purpose or dedicated controller for operating the image capturing apparatus 101. The control apparatus 103 receives image data transmitted from the image capturing apparatus 101 to display an image, and transmits operation information to the image capturing apparatus 101 in response to an operation by a user. The operation information is control information for causing the image capturing apparatus 101 to execute a specific function, and includes information for controlling drive of the image capturing apparatus 101 in the pan direction or the tilt direction, and information for controlling a zoom magnification and a focus position of an imaging optical system.

The network 104 is implemented by the Internet, a wired or wireless local area network (LAN), a wide area network (WAN), or a combination of these networks. The network 104 includes a plurality of routers, switches, and cables conforming to a communication standard such as the Ethernet®. As long as the network 104 has a configuration that enables communication between the image capturing apparatus 101, the information processing apparatus 102, and the control apparatus 103, the network 104 may use any type of communication standard, be in any scale, and employ any configuration.

(Apparatus Configuration)

Figure 2:
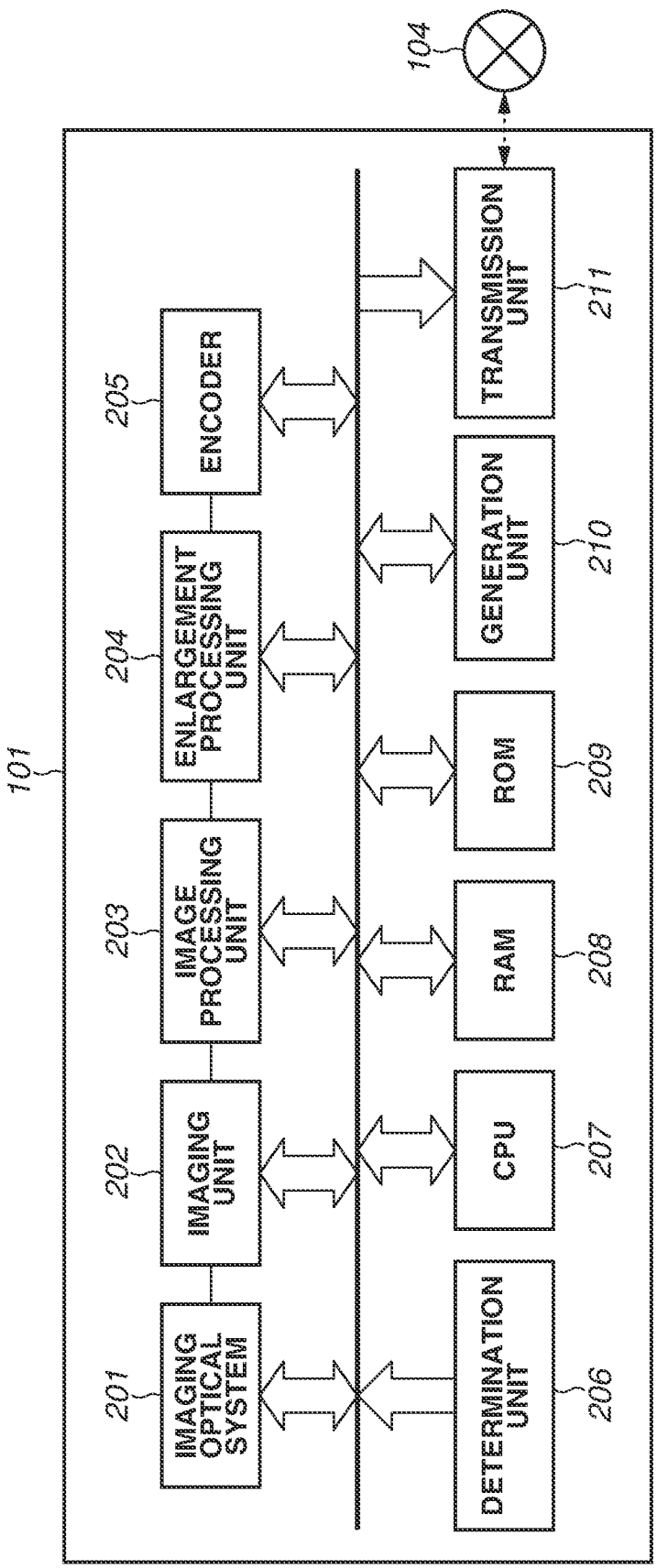
FIG. 2 illustrates a configuration of an image capturing apparatus according to the present exemplary embodiment.

FIG. 2 is a diagram illustrating an example of a configuration of the image capturing apparatus 101 according to the present exemplary embodiment. The image capturing apparatus 101 includes an imaging optical system 201, an imaging unit 202, an image processing unit 203, an enlargement processing unit 204, an encoder 205, a determination unit 206, a central processing unit (CPU) 207, a random access memory (RAM) 208, and a read only memory (ROM) 209.

The imaging optical system 201 is a lens for focusing light from a subject on an image sensing surface of the imaging unit 202, and includes a zoom lens, a focus lens, and a blur correction lens, for example. In the present exemplary embodiment, the imaging optical system 201 is integral with the image capturing apparatus 101, but may be detachably attached in a manner similar to an interchangeable lens. The imaging optical system 201 drives the lens to change the magnification for the optical zoom and to adjust the focus position depending on the distance to a subject, based on the operation information received from the control apparatus 103. Accordingly, the viewing angle is changed as a result of a change of the magnification (focal length) for the optical zoom and an adjustment of the focus position.

The imaging unit 202 is an image sensor that captures an image of a subject. For example, the imaging unit 202 is a charge coupled device (CCD) sensor or a complementary metal oxide semiconductor (CMOS) sensor. The imaging unit 202 captures the image of the subject by converting light from the subject focused by the imaging optical system 201 into an electrical signal and outputting the electrical signal.

The image processing unit 203 converts the electrical signal from the imaging unit 202 into a digital signal by performing analog-to-digital (AD) conversion. The converted digital signal is handled as image data, and processing such as correction of an influence of lens distortion aberration, to be described below, is performed on the image data.

The enlargement processing unit 204 performs enlargement processing (digital zoom processing) for an image generated by the image processing unit 203, by clipping a part of the image data to perform electronic enlargement. The enlargement processing unit 204 also functions as a control unit that controls the lens position of the imaging optical system 201. The enlargement processing unit 204 performs the optical zoom by controlling the lens position of the imaging optical system 201.

A magnification for the optical zoom and an enlargement factor for the enlargement processing executed by the enlargement processing unit 204 are determined by the determination unit 206.

The determination unit 206 determines at least one mode among a plurality of modes related to the viewing angle of the image capturing apparatus 101. The user operates an operation unit such as the control apparatus 103, thereby selecting an enlargement mode from the plurality of modes (enlargement modes) related to the viewing angle. Further, a magnification (an enlargement factor) in the selected mode is set. The determination unit 206 determines the enlargement mode and the enlargement factor therefor based on the instruction from the user as described above. The enlargement modes include a mode (digital zoom) for performing enlargement processing in response to an enlargement operation by a user, a mode (digital tele-converter, a second mode) for uniformly applying a fixed magnification to an image, and a mode (optical interlocking digital zoom, a third mode) for determining an enlargement factor in an interlocked manner with the position of the zoom lens of the imaging optical system 201. In this way, the plurality of modes related to the viewing angle is present as the enlargement mode. The determination of the enlargement mode and the enlargement factor is not limited to the case where the determination is based on the user instruction as in the present exemplary embodiment. For example, in a case where a specific subject is detected by image analysis, the enlargement mode and the enlargement factor may be determined as suited so that a ratio of the detected subject to the image is more than or equal to a predetermined value.

The above-described plurality of modes related to the viewing angle will be described. In the present exemplary embodiment, the modes related to the viewing angle include "optical zoom+digital zoom (a first mode)", "digital tele-converter (×2)", "digital tele-converter (×3), and "optical interlocking digital zoom". The optical zoom+digital zoom is a mode in which an electronic magnification is 1 before the lens position of the imaging optical system 201 arrives at the telephoto end, and the digital zoom is performed as the enlargement processing for the telephoto end and thereafter. The digital tele-converter is a mode in which the magnification for the digital zoom is fixed to a predetermined magnification and the optical zoom is performed. The optical interlocking digital zoom is a mode in which the electronic magnification is changed in an interlocked manner with a change in the lens position caused by the optical zoom. In this way, the above-described plurality of modes (enlargement modes) related to the viewing angle is implemented by a combination of the first mode and the magnification setting thereof and the second mode and the magnification setting thereof, and the determination unit 206 determines which mode among the plurality of modes is to be used.

In addition, as in a table illustrated in FIG. 3, a number (an enlargement mode identification (ID) number) for identification is assigned to each of the enlargement modes. In other words, the enlargement mode ID number is a first parameter indicating the mode determined by the determination unit 206. The table illustrated in FIG. 3 is a table in which the mode determined by the determination unit 206 and the enlargement mode ID number are associated with each other and which is stored in a storage unit such as the ROM 209. The first parameter is generated by a generation unit 210 to be described below. More specifically, the generation unit 210 generates the enlargement mode ID number corresponding to the enlargement mode determined by the determination unit 206 by referring to the table stored in the storage unit.

The encoder 205 encodes the image-processed image data into a file format such as Motion Joint Photographic Experts Group (Motion JPEG), H.264, or H.265, and outputs the encoded image data. The encoded image data is output to the information processing apparatus 102 and the control apparatus 103 via the network 104.

The CPU 207 comprehensively controls the image capturing apparatus 101. The CPU 207 reads a program loaded into the RAM 208, thereby executing at least some of the functions to be described below of the image capturing apparatus 101.

The RAM 208 provides a work area that the CPU 207 uses when executing a program. The RAM 208 also functions as a frame memory and as a buffer memory.

The ROM 209 stores a program for the CPU 207 to control the image capturing apparatus 101, and data such as image data, optical data related to the imaging optical system 201, and optical correction data.

The generation unit 210 generates data in which the zoom lens position (or focal length) of the imaging optical system 201 and the enlargement mode ID number obtained from the determination unit 206 are superimposed on each other. In other words, the generation unit 210 generates the first parameter, and a second parameter indicating the lens position of the imaging optical system 201. In the present exemplary embodiment, the first parameter and the second parameter are generated as one piece of 24-bit data, but the first parameter and the second parameter may be generated as separate pieces of data. In the present exemplary embodiment, it is desirable to generate these parameters as one piece of data for a reason to be described below.

A transmission unit 211 outputs the data generated by the generation unit 210. The transmission unit 211 outputs data that includes the focus position and the aperture of the imaging optical system 201 as the camera setting information in addition to the data generated by the generation unit 210. The output camera setting information is transmitted to the information processing apparatus 102 via the network 104.

FIG. 4 is a diagram illustrating an example of a configuration of the information processing apparatus 102 according to the present exemplary embodiment. The information processing apparatus 102 includes a CPU 401, a RAM 402, a ROM 403, an input interface (I/F) 404, an output OF 405, and a network OF 406.

The CPU 401 comprehensively controls the information processing apparatus 102. The CPU 401 reads a program loaded into the RAM 402, thereby executing at least some of the functions to be described below of the information processing apparatus 102.

The RAM 402 provides a work area that the CPU 401 uses when executing a program. The RAM 402 also functions as a frame memory and as a buffer memory.

The RAM 402 also functions as a memory area for loading data related to the imaging optical system 201 of the image capturing apparatus 101.

The ROM 403 stores a program for the CPU 401 to control the information processing apparatus 102, and data such as image data.

The input OF 404 is an interface for receiving input from the user, such as a keyboard and a mouse. Coordinates of a viewpoint, a view angle, a direction of the viewpoint, and the like are input to the input I/F 404.

The output OF 405 is an interface for displaying an image, such as a display. The output OF 405 displays an image captured by the image capturing apparatus 101, displays a computer graphics (CG) image of a virtual space, or displays a combined image obtained by combining the image captured by the image capturing apparatus 101 and the CG image.

The network OF 406 is an interface for connecting to the image capturing apparatus 101 via the network 104 and receiving the image output from the image capturing apparatus 101 and information about calculation of the viewing angle of the image capturing apparatus 101, i.e., the first parameter and the second parameter (the enlargement mode ID number, and the zoom lens position).

Next, a functional configuration of the information processing apparatus 102 will be described. The information processing apparatus 102 includes an acquisition unit 407, a setting unit 408, a generation unit 409, and a display control unit 410. A program for providing a function of each of the functional blocks is stored in a storage unit such as the ROM 403. The program is then read into the RAM 402 and executed by the CPU 401, so that the function is implemented. For a function implemented by hardware, a dedicated circuit may be automatically generated on a field-programmable gate array (FPGA) from the program for implementing the function of each of the functional blocks, by using a predetermined compiler. A gate array circuit may be formed in a manner similar to the FPGA and implemented as the hardware. The function may also be implemented by an application specific integrated circuit (ASIC).

A plurality of functional blocks may constitute one functional block, or any one of the functional blocks may be divided into blocks that perform a plurality of functions.

The acquisition unit 407 acquires the image (the image of the real space) captured by the image capturing apparatus 101 and the camera setting information (including the information about a viewing angle in the real space) output from the transmission unit 211.

The setting unit 408 sets or updates a viewing angle corresponding to the viewing angle in the real space as a viewing angle in the virtual space based on the camera setting information acquired by the acquisition unit 407.

The generation unit 409 generates an image (CG image) of the virtual space based on the viewing angle in the virtual space set by the setting unit 408. In addition, the generation unit 409 combines the image of the real space acquired by the acquisition unit 407 and the generated image of the virtual space, thereby generating a combined image in which a subject in the real space is captured as if the subject is present in the virtual space.

The display control unit 410 controls the output OF 405 to display at least one of the combined image (the image of the real space and the virtual space) generated by the generation unit 409 or the image acquired by the acquisition unit 407.

(About Difference Between Viewing Angle Calculated from Focal Length and Actual Viewing Angle)

An influence of a difference between a viewing angle calculated from a focal length and an image sensor and an actual viewing angle of the image capturing apparatus 101 will be described.

Figure 5A:
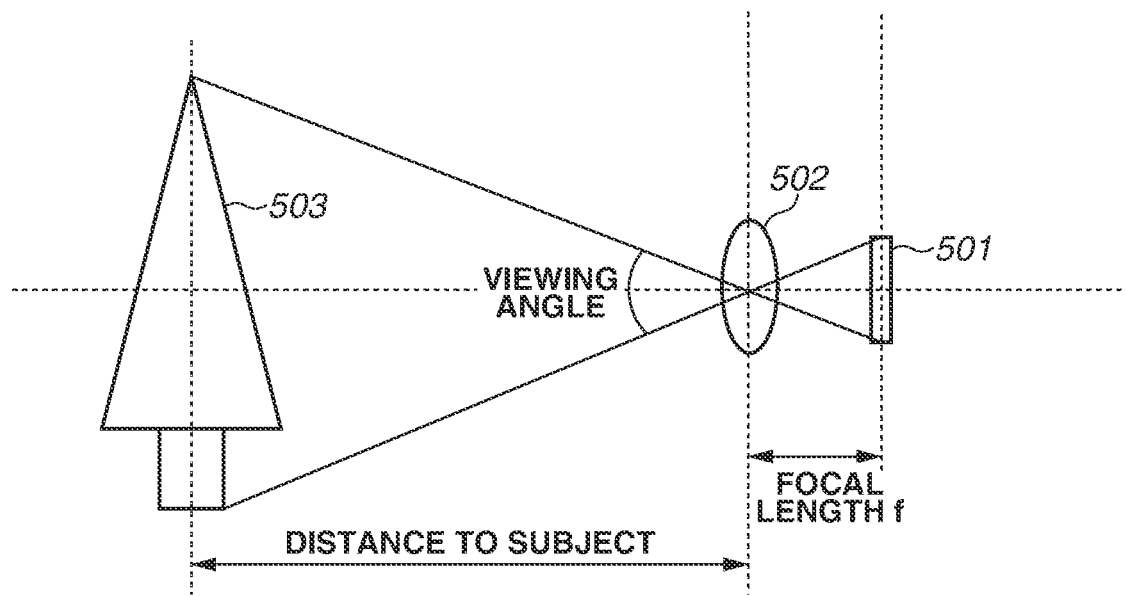
FIGS. 5A and 5B are diagrams illustrating the relationship between viewing angle and focal length.
Figure 5B:
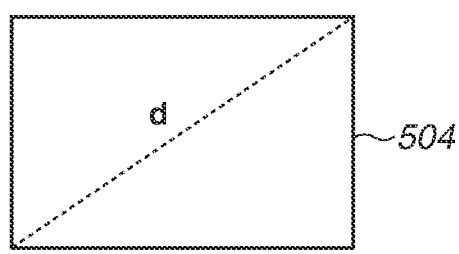

FIG. 5A is a diagram illustrating the relationship between the viewing angle and the focal length. An imaging unit 501 (similar to the imaging unit 202 described above), a lens 502, and a subject 503 are illustrated. In general, a viewing angle (a diagonal viewing angle $\theta$) can be expressed by a focal length f of an imaging optical system and a diagonal length d of an effective pixel area 504 of the imaging unit 501 in FIG. 5B, based on the following equation. In a case where a horizontal viewing angle or a vertical viewing angle of the imaging unit 501 is $\theta$, the viewing angle $\theta$ can be similarly calculated using a horizontal length or a vertical length as d, by the following equation.

$$\theta = 2 \times \tan^{-1}(d/(2 \times f)) \quad (1)$$

Meanwhile, for the image capturing apparatus 101 of a recent type, there is a technique that adopts an imaging optical system having a large distortion aberration to achieve downsizing and digitally reduces the distortion aberration in post processing. In the image processing unit 203, image data, which is acquired as a digital signal by AD conversion of output from the imaging unit 202, is subjected to distortion aberration correction electronically using a table such as a correction table calculated from optical designed values.

Figure 6A:
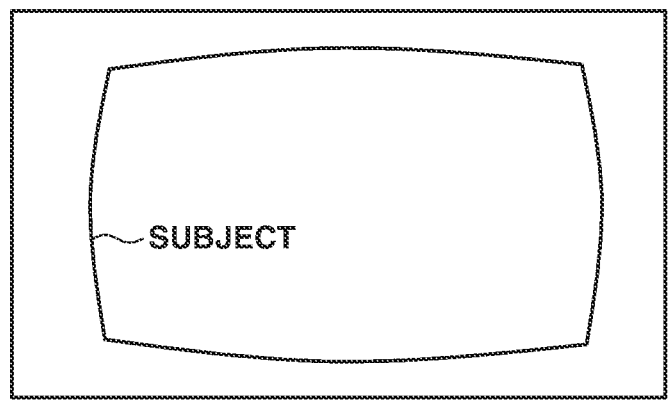
FIGS. 6A and 6B are diagrams illustrating distortion aberration correction.
Figure 6B:
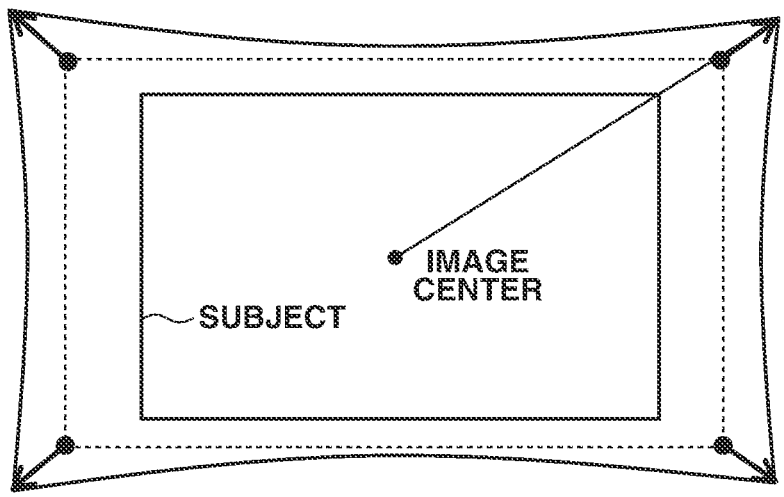

FIGS. 6A and 6B are diagrams illustrating an example of lens distortion aberration correction. FIG. 6A illustrates a state before the distortion aberration correction, and a subject is distorted into a barrel shape. The subject in FIG. 6A is corrected by the four corners of the subject being pulled diagonally from the center based on a correction table, so that the distortion is corrected and thus reduced as illustrated in FIG. 6B. In this process, the viewing angle can be changed (narrowed in the example in FIGS. 6A and 6B) depending on how the distortion aberration correction is applied.

Figure 7A:
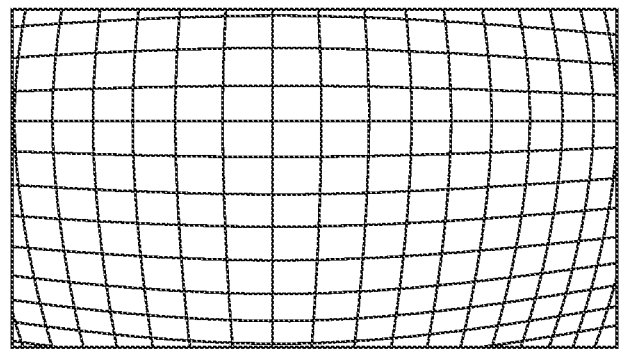
FIGS. 7A, 7B, and 7C are diagrams illustrating the difference between distortions at zoom lens positions.
Figure 7B:
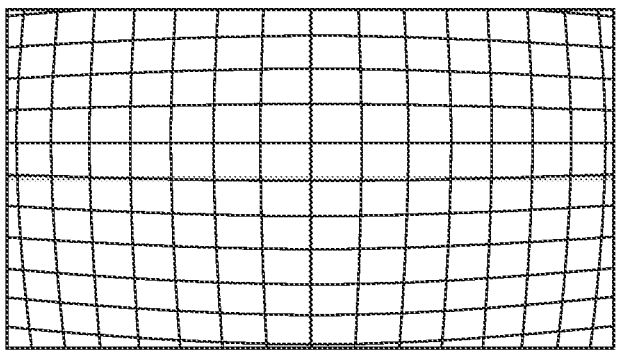

The magnitude of the distortion aberration changes depending on the position of a zoom lens. For example, the barrel-shaped distortion aberration is large when the zoom lens position is on the wide-angle side as illustrated in FIG. 7A, and the barrel-shaped distortion aberration becomes smaller as the zoom lens position shifts toward the telephoto side as illustrated in FIG. 7B.

Figure 7C:
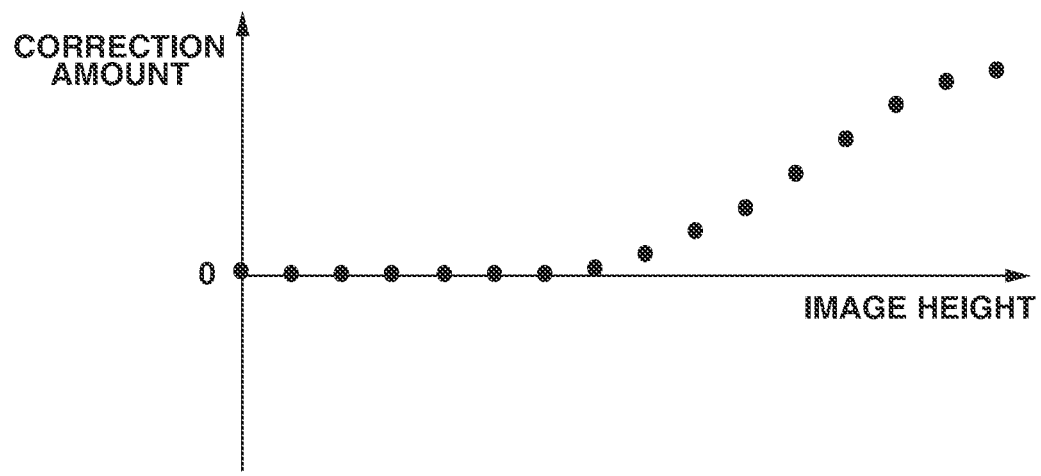

In addition, the magnitude of the distortion changes depending on an image height of the imaging unit. The influence of the distortion aberration is smaller as the image height is smaller (for a position closer to the screen center), while the influence of the distortion aberration is larger as the image height is larger (for a position farther from the screen center) as illustrated in FIG. 7C.

Thus, if a central area of a video image of the imaging unit is subjected to electronic enlargement (digital zoom), the influence of the distortion aberration is small for a large electronic enlargement factor, and the influence of the distortion aberration is large for a small electronic enlargement factor, even if the lens positions are the same.

Therefore, in a case where the distortion aberration correction is applied in the manner described above, a precise viewing angle cannot be calculated using the above-described equation (1).

(Description of Operation of Image Capturing Apparatus)

Figure 8:
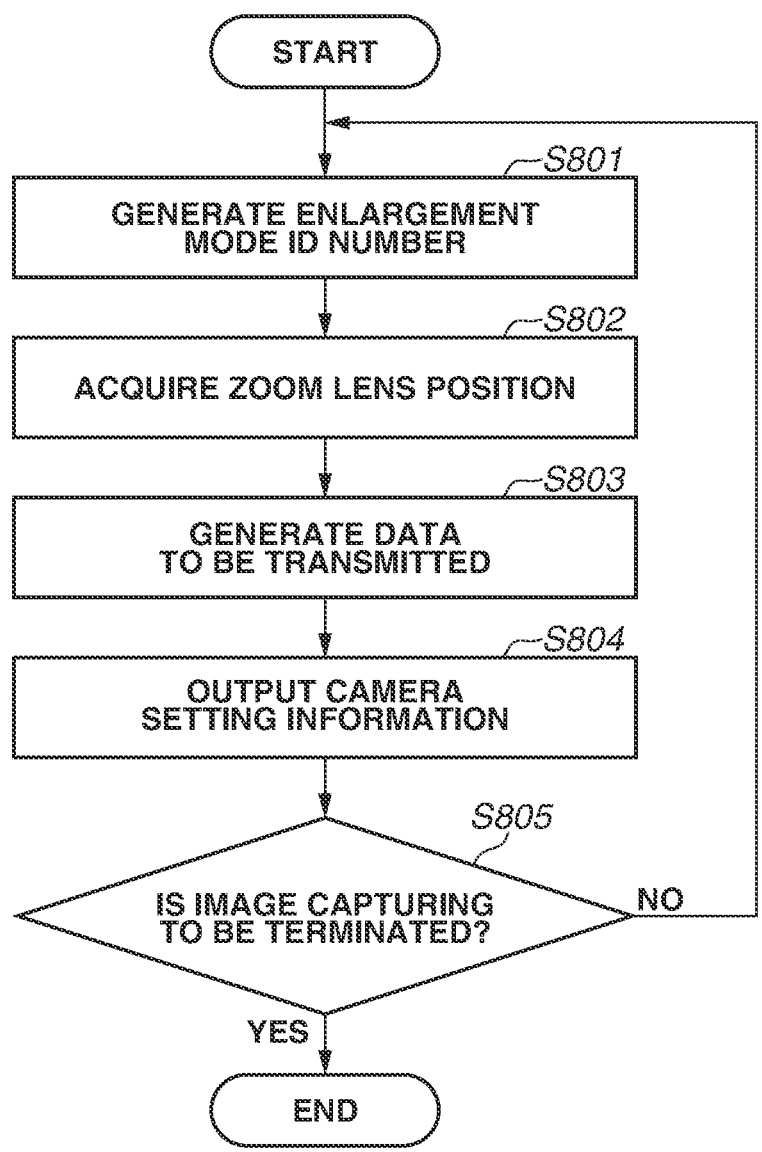
FIG. 8 illustrates a flowchart of processing executed in the image capturing apparatus according to the present exemplary embodiment.

The operation of the image capturing apparatus 101 according to the present exemplary embodiment will be described with reference to FIG. 8. FIG. 8 is a flowchart illustrating the operation of the image capturing apparatus 101 according to the present exemplary embodiment. The CPU 207 of the image capturing apparatus 101 loads a program stored in the ROM 209 into the RAM 208 and executes the program loaded into the RAM 208, so that the operation in the flowchart illustrated in FIG. 8 begins.

In step S801, the generation unit 210 generates an enlargement mode ID number N (the first parameter) corresponding to an enlargement mode determined by the determination unit 206. The enlargement mode ID number N is an individual ID number assigned to each of the enlargement modes as illustrated in FIG. 3 as described above. The generation unit 210 generates the enlargement mode ID number N indicating that an enlargement mode determined by a user operation, or an enlargement mode automatically determined based on a condition that the zoom lens position exceeds the optical telephoto end, corresponds to which one of the plurality of enlargement modes.

Subsequently, in step S802, the generation unit 210 acquires the lens position (the second parameter) of the imaging optical system 201. Here, a zoom lens position Z is acquired. The zoom lens position Z mentioned here may be coordinates of the actual position of the lens, or may be the focal length.

Figure 9:
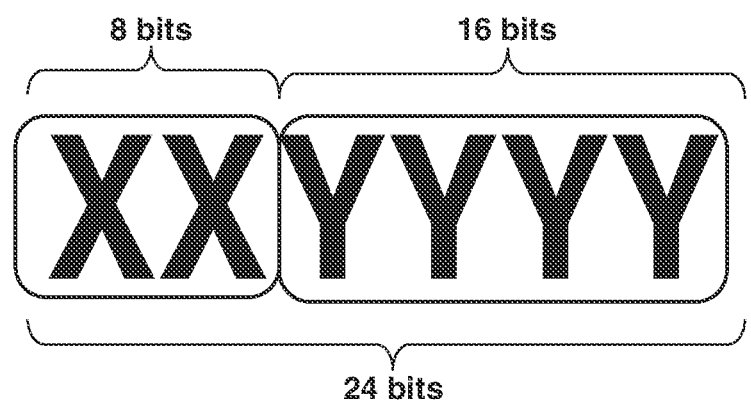
FIG. 9 is a diagram illustrating a bit arrangement of camera data according to the present exemplary embodiment.

In step S803, the generation unit 210 generates camera data D to be transmitted to the information processing apparatus 102 based on the enlargement mode ID number N acquired in step S801 and the zoom lens position Z acquired in step S802. How the camera data D is generated will be described through an example. In a case where data to be transmitted is 24-bit data as illustrated in FIG. 9, the enlargement mode ID number N is stored in high-order 8 bits (an XX portion in FIG. 9) and the zoom lens position Z is stored in low-order 16 bits (a YYYY portion in FIG. 9). Suppose the digital tele-converter (×2) is selected as the enlargement mode and the zoom lens position Z is a position indicated by "054C" in hexadecimal. In this case, according to the table in FIG. 3, if the digital tele-converter (×2) is selected as the enlargement mode, the enlargement mode ID number N is "01", and "01" is stored in the high-order 8 bits (the XX portion in FIG. 9) of 24 bits. In the remaining low-order 16 bits (the YYYY portion in FIG. 9), "054C" is stored as the zoom lens position Z. The camera data D is thereby generated as "01054C".

Data stored in the YYYY portion (the low-order 16 bits of the camera data D) illustrated in FIG. 9 may be a parameter representing the focal position of the imaging optical system 201. Therefore, the data may be a parameter indicating the lens position as in the present exemplary embodiment, or may be a focal length F of the imaging optical system 201.

In step S804, the transmission unit 211 outputs camera setting information including the camera data D. As described above, the camera setting information includes the panning angle and the tilting angle of the image capturing apparatus 101, and the information processing apparatus 102 receives the camera setting information from the image capturing apparatus 101. In step S805, the CPU 207 determines whether to terminate image capturing. The operation of the flowchart ends if the image capturing is terminated (YES in step S805), whereas the operation returns to step S801 if the image capturing is not terminated (NO in step S805). The operation may return to step S802 in a case where the zoom lens position Z does not vary.

(Description of Operation of Information Processing Apparatus)

Figure 10:
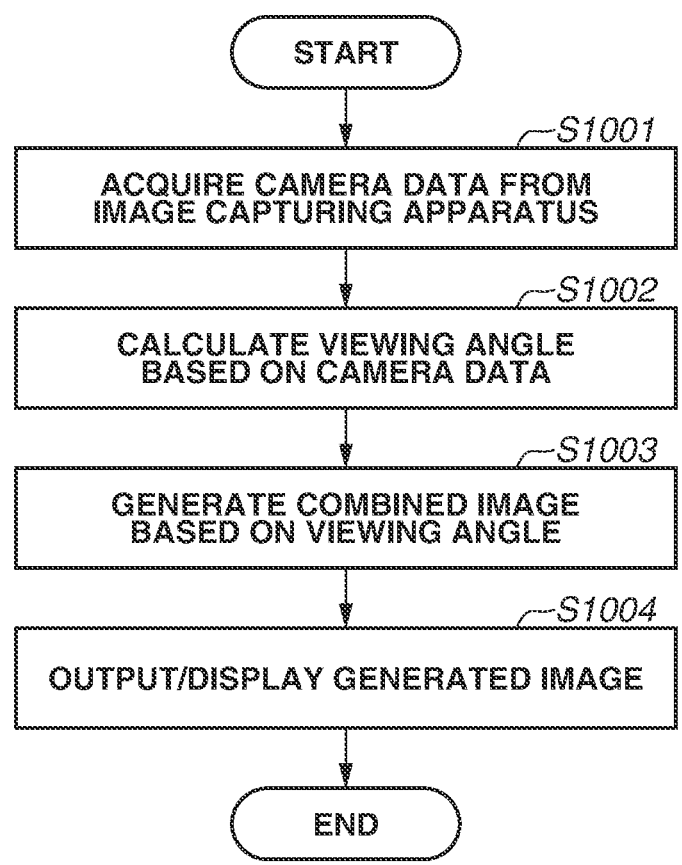
FIG. 10 illustrates a flowchart of processing executed in the information processing apparatus according to the present exemplary embodiment.

The operation of the information processing apparatus 102 according to the present exemplary embodiment will be described with reference to FIG. 10. FIG. 10 is a flowchart illustrating the operation of the information processing apparatus 102 according to the present exemplary embodiment. The CPU 401 of the information processing apparatus 102 loads a program stored in the ROM 403 into the RAM 402 and executes the program loaded into the RAM 402, so that the operation in the flowchart illustrated in FIG. 10 begins.

In step S1001, the acquisition unit 407 acquires the camera setting information including the camera data D from the image capturing apparatus 101. In addition, the acquisition unit 407 acquires an image captured by the image capturing apparatus 101.

Next, in step S1002, the CPU 401 identifies a viewing angle of the image capturing apparatus 101, based on the camera data D acquired by the acquisition unit 407.

A case where optical information from a manufacturer of the image capturing apparatus 101 or the lens is used to calculate the viewing angle will be described. The optical information may be acquired from a storage unit such as the ROM 209 of the image capturing apparatus 101, or may be acquired from a storage unit such as the ROM 403 of the information processing apparatus 102. In the case of an interchangeable lens, the optical information can be acquired by reading the optical information from a storage unit in the lens when the lens is attached to the image capturing apparatus 101. Typically, it is desirable that distortion viewing angle data be determined based on a zoom lens position (or focal length) on a one-to-one basis. In the format according to the present exemplary embodiment, the zoom lens position (or optical focal length) is uniform except for the enlargement mode ID number N (the high-order 8 bits of the camera data D of the present exemplary embodiment), and thus a precise viewing angle can be calculated from the optical information, whichever enlargement mode is selected.

Figure 12:
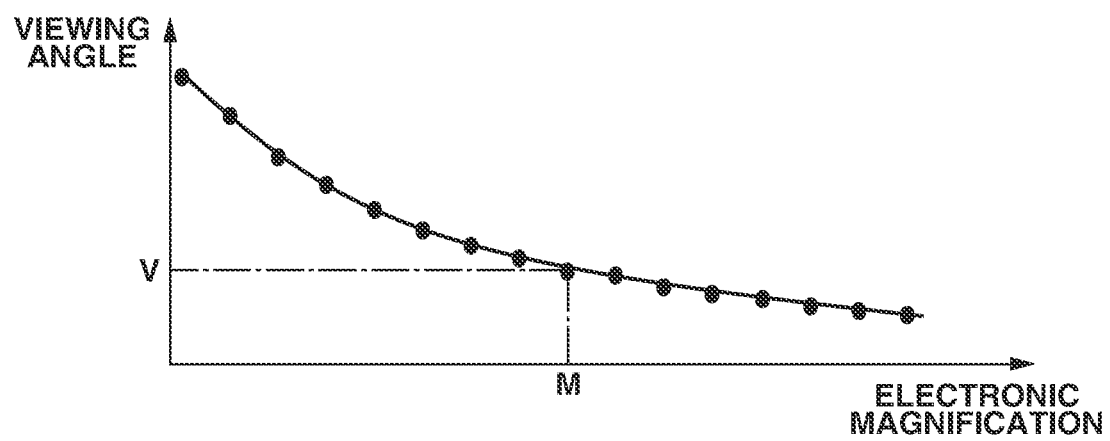
FIG. 12 is a diagram illustrating the relationship between electronic magnification and viewing angle at a zoom lens position according to the present exemplary embodiment.

For example, assume that a table indicating the relationship between the camera data D and an electronic magnification M in FIG. 11 and a viewing angle characteristic indicating the relationship between the electronic magnification M and a viewing angle V at each zoom lens position as illustrated in FIG. 12 are stored as the optical information.

Each broken line in FIG. 11 indicates the border between the enlargement mode ID numbers N. In the present exemplary embodiment, a case where the camera data D varying in the enlargement mode ID number N is in the same table will be described, but a table (to be accurate, a table of low-order 16 bits of the camera data D) of the camera data D may be prepared for each of the enlargement mode ID numbers. In that case, a table to be referred to is identified based on the value of the enlargement mode ID number N.

In a case where the camera data D is "01054C", the electronic magnification M is identified as "2" from the table in FIG. 11. The zoom lens position Z can be read from the low-order 16 bits of the camera data D, and thus the viewing angle characteristic illustrated in FIG. 12 and corresponding to the zoom lens position Z can be read.

The viewing angle characteristic in FIG. 12 is stored for the value of each of the zoom lens positions Z. The viewing angle characteristic to be used to identify the viewing angle is determined based on the value of the zoom lens position Z. In the present exemplary embodiment, FIG. 12 illustrates the viewing angle characteristic in a case where the zoom lens position Z is "054C".

If the electronic magnification M "2" corresponding to the camera data D "01054C" is read from the table in FIG. 11 and the viewing angle V corresponding to the electronic magnification M "2" is referred to using the viewing angle characteristic in FIG. 12, the viewing angle of the image capturing apparatus 101 (the viewing angle of the real space) can be identified.

The reason why the zoom lens position Z (the low-order 16 bits of the camera data D) varies after the zoom lens position Z exceeds the telephoto end of the imaging optical system 201 will be described as a supplementary description. The low-order 16 bits of the camera data D indicate the focal position of the image capturing apparatus 101, and the focal position is comprehensively determined by a change in the lens position of the imaging optical system 201 and a change in the electronic magnification in the digital zoom processing of the enlargement processing unit 204. Therefore, in a case where the lens position of the imaging optical system 201 is located at the telephoto end and the enlargement processing is further performed by the digital zoom processing, the zoom lens position Z is virtually increased with an increase in the electronic magnification M. For the zoom lens position Z greater than a predetermined zoom lens position Z, the information processing apparatus 102 determines that the lens position of the imaging optical system 201 is at the telephoto end. In the case in FIG. 11, for the zoom lens position Z for which the low-order 16 bits of the camera data D indicate "4000" or more, the information processing apparatus 102 determines that the lens position is at the telephoto end, and the viewing angle characteristic (the characteristic illustrated in FIG. 12) to be referred to using the optical information is fixed. Therefore, the zoom lens position Z is the second parameter corresponding to the lens position of the imaging optical system 201.

In a case where the optical information from the manufacturer of the image capturing apparatus or the lens is not available or not used, table data T representing the relationship between the viewing angle V and the camera data D as illustrated in FIG. 13 can be obtained by execution of calibration for the image capturing apparatus by a user, using a dedicated application or the like. In addition, in the present case, the enlargement mode ID number N can be read from the high-order bits of the camera data D, and the electronic enlargement mode can be determined by the information processing apparatus 102, and therefore, the precise viewing angle V can be easily obtained if the calibration in each electronic enlargement mode is performed. In a case where there is an enlargement mode not used by the user among the plurality of enlargement modes, the calibration may be performed only for enlargement modes used by the user. The calibration is performed by identifying the viewing angle V corresponding to the zoom lens position Z for each of the enlargement modes.

In step S1003, the generation unit 409 generates an image (CG image) of a virtual space based on information about a viewpoint set in the virtual space. As described above, it is necessary to set the viewing angle of the viewpoint (the virtual camera) set in the virtual space based on the viewing angle in the real space, i.e., the viewing angle V, in order to generate the image of the virtual space. Thus, a processor (the CPU 401) of the information processing apparatus 102 identifies the viewing angle of the real space (the viewing angle of the image capturing apparatus 101) for setting the viewing angle of the virtual space (the viewing angle of the virtual camera) based on the first parameter (the enlargement mode ID number N) and the second parameter (the zoom lens position Z). The image of the virtual space can be thereby generated using a viewing angle only slightly different from the viewing angle of the real space. The generation unit 409 of the information processing apparatus 102 generates the image of the virtual space. Subsequently, the generation unit 409 of the information processing apparatus 102 combines the generated image of the virtual space and the image of the real space captured by the image capturing apparatus 101. The image of the real space captured by the image capturing apparatus 101 is acquired by the acquisition unit 407 of the information processing apparatus 102, and the viewing angle of the virtual space is set by the setting unit 408 of the information processing apparatus 102 based on the viewing angle of the real space.

In step S1004, the display control unit 410 outputs or displays the image generated in step S1003 to or on the output OF 405 (a display unit).

In the image capturing apparatus 101 according to the present exemplary embodiment, the information processing apparatus 102 can calculate a precise viewing angle of the image capturing apparatus 101, so that it is possible to reduce discomfort in the combined image in which the image captured by the image capturing apparatus 101 and the image of the virtual space are combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-089133, filed May 31, 2022, which is hereby incorporated by reference herein in its entirety.

What is claimed is:

1. An image capturing apparatus that communicates with an information processing apparatus that performs processing of combining an image of a real space and an image of a virtual space, the image capturing apparatus comprising:
   an imaging unit configured to capture an image of a subject formed by an imaging optical system;
   at least one processor; and
   a memory in communication with the at least one processor, the memory storing instructions that, when executed by the at least one processor, cause the processor to function as:
   a determination unit configured to determine at least one mode among a plurality of modes related to a viewing angle of the image capturing apparatus;
   a generation unit configured to generate camera data including a first parameter indicating the mode determined by the determination unit and a second parameter corresponding to a lens position of the imaging optical system; and
   a transmission unit configured to transmit camera setting information including the camera data to the information processing apparatus,
   wherein the first parameter and the second parameter are used to identify the viewing angle of the image capturing apparatus, and
   wherein the plurality of modes related to the viewing angle includes a first mode for individually performing enlargement processing by clipping a part of an image and change processing changing the viewing angle of the image capturing apparatus by changing the lens position, a second mode for performing the change processing by fixing an enlargement factor for the enlargement processing in the first mode, and a third mode for interlocking the lens position and the enlargement factor in the first mode.

2. The image capturing apparatus according to claim 1, further comprising:
an enlargement processing unit configured to perform the enlargement processing; and
a control unit configured to change the viewing angle of the image capturing apparatus by changing the lens position.

3. The image capturing apparatus according to claim 1, wherein the camera setting information includes the camera data and a position and a direction of the image capturing apparatus, and is generated by the generation unit.

4. The image capturing apparatus according to claim 1, wherein a high-order bit portion of the camera data indicates the first parameter, and a low-order bit portion of the camera data indicates the second parameter.

5. The image capturing apparatus according to claim 1, wherein the camera data consists of 24 bits in hexadecimal, and high-order 8 bits of the camera data indicate the first parameter, and low-order 16 bits of the camera data indicate the second parameter.

6. The image capturing apparatus according to claim 1, wherein the identified viewing angle of the image capturing apparatus is used to set a viewing angle of a camera in the virtual space.

7. A method of controlling an image capturing apparatus that communicates with an information processing apparatus that performs processing of combining an image of a real space and an image of a virtual space, the method comprising:
capturing an image of a subject formed by an imaging optical system;
determining at least one mode among a plurality of modes related to a viewing angle of the image capturing apparatus;
generating camera data including a first parameter indicating the determined mode, and a second parameter corresponding to a lens position of the imaging optical system; and
transmitting camera setting information including the camera data to the information processing apparatus,
wherein the first parameter and the second parameter are used to identify the viewing angle of the image capturing apparatus, and
wherein the plurality of modes related to the viewing angle includes a first mode for individually performing enlargement processing by clipping a part of an image and change processing changing the viewing angle of the image capturing apparatus by changing the lens position, a second mode for performing the change processing by fixing an enlargement factor for the enlargement processing in the first mode, and a third mode for interlocking the lens position and the enlargement factor in the first mode.

8. The method of controlling the image capturing apparatus according to claim 7, further comprising generating camera setting information including the camera data, and a position and a direction of the image capturing apparatus.

9. A non-transitory computer-readable storage medium storing a program for causing a computer to perform a method of controlling an image capturing apparatus that communicates with an information processing apparatus that performs processing of combining an image of a real space and an image of a virtual space, the method comprising:
capturing an image of a subject formed by an imaging optical system;
determining at least one mode among a plurality of modes related to a viewing angle of the image capturing apparatus;
generating camera data including a first parameter indicating the determined mode, and a second parameter corresponding to a lens position of the imaging optical system; and
transmitting camera setting information including the camera data to the information processing apparatus,
wherein the first parameter and the second parameter are used to identify the viewing angle of the image capturing apparatus, and
wherein the plurality of modes related to the viewing angle includes a first mode for individually performing enlargement processing by clipping a part of an image and change processing changing the viewing angle of the image capturing apparatus by changing the lens position, a second mode for performing the change processing by fixing an enlargement factor for the enlargement processing in the first mode, and a third mode for interlocking the lens position and the enlargement factor in the first mode.

* * * * *